United States Patent [19]

Rees

[11] Patent Number: 4,580,755

[45] Date of Patent: Apr. 8, 1986

[54] LATCH ARRANGEMENT FOR A SEAT SLIDE STRUCTURE

[75] Inventor: Richard W. A. Rees, West Bloomfield, Mich.

[73] Assignee: General Motors Corporation, Detroit, Mich.

[21] Appl. No.: 710,289

[22] Filed: Mar. 11, 1985

[51] Int. Cl.$^4$ ............................................. F16M 13/00
[52] U.S. Cl. ..................................... 248/430; 248/424
[58] Field of Search ....................... 248/430, 429, 424; 297/341; 296/65 R; 312/333

[56] References Cited

U.S. PATENT DOCUMENTS

| | | | |
|---|---|---|---|
| 3,524,677 | 8/1970 | Louton | 248/430 X |
| 3,940,182 | 2/1976 | Tamura | 297/341 |
| 4,004,772 | 1/1977 | Pickles | 248/430 |
| 4,169,574 | 10/1979 | Garvey et al. | 296/65 R X |
| 4,204,658 | 5/1980 | Courtois | 248/430 |
| 4,262,963 | 4/1981 | Bauer et al. | 248/430 X |
| 4,378,101 | 3/1983 | Kazaoka et al. | 248/430 X |
| 4,497,518 | 2/1985 | Nishimura et al. | 297/341 |

Primary Examiner—Ramon S. Britts
Assistant Examiner—Ramon O. Ramirez
Attorney, Agent, or Firm—Herbert Furman

[57] ABSTRACT

A latch structure for a seat slide structure includes a latch member pivoted to the base wall of the movable one of a pair of track members and having a latch portion extending inwardly of the one track member and provided with at least one latched tooth engageable within openings in the track members to releasably latch the track members to each other. The latch member is biased to a latched position by a spring anchored between the latch member and the one track member. Where a pair of spaced seat slide structures are each provided with latch structures, simultaneous movement of the latch members of these structures to released position is effected by interconnecting the latch members with a slightly slack cable. A release lever is coaxially pivoted with one of the latch members and mounts a pulley engageable with the cable to effect shortening of the cable intermediate the anchored ends thereof and simultaneous movement of the latch members to released position.

2 Claims, 6 Drawing Figures

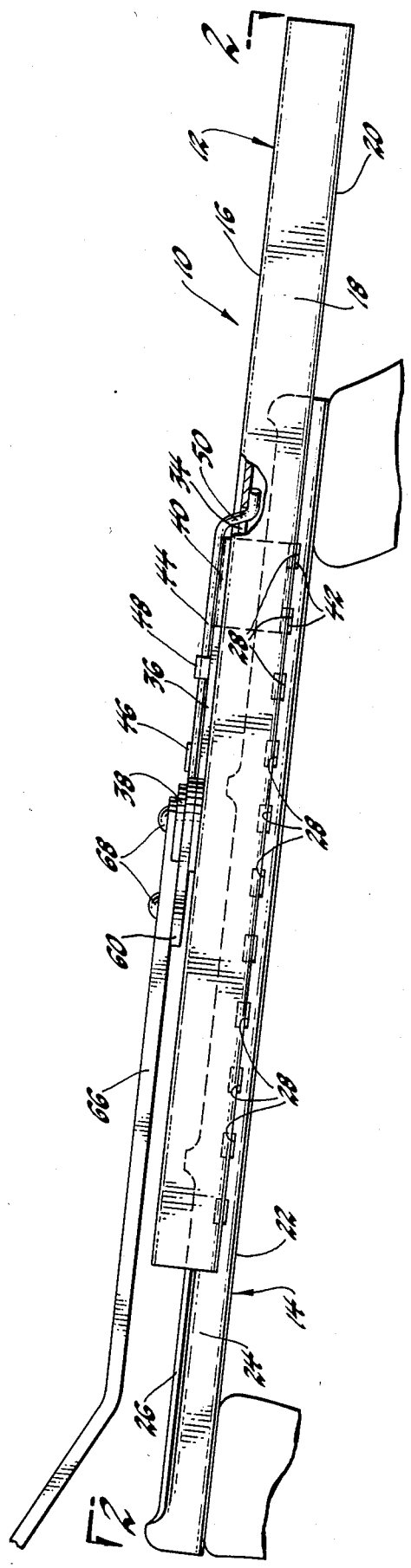
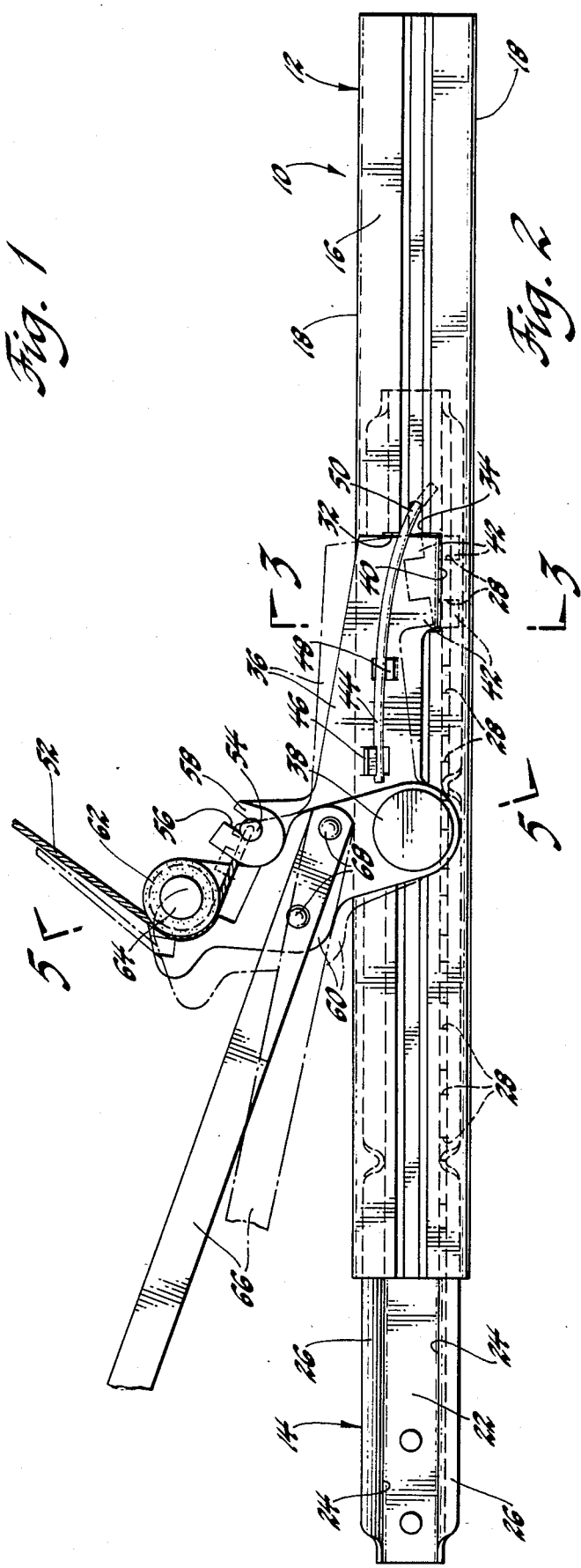

LATCH ARRANGEMENT FOR A SEAT SLIDE STRUCTURE

This invention relates to a latch arrangement for seat slide structures and more particularly to an improved latch structure for latching the track members of a seat slide structure to each other and an improved release arrangement for effecting simultaneous release of the latch structures of spaced seat slide structures.

In its preferred embodiment, the latch structure of this invention includes a latch member which is pivoted to the base wall of the upper one of a pair of seat track members and includes a latch portion which extends inwardly through an opening in such base wall. The latch portion terminates in at least one latch tooth. In latched position, the latch tooth extends outwardly through at least one of a series of openings in the side wall of the other track member and into engagement with at least one opening in the terminal flange of the one track member to latch the track members to each other. A wire type spring biases the latch member to the latched position. The spring is anchored to the latch member adjacent its pivot and also anchored within the opening in the base wall of the one track member. The latch portion engages the side edge of the opening in the base wall of the one track member to locate the latch member in latched position. The latch structure is thus comprised of a minimum number of parts and can be easily assembled to the one track member.

Where a seat is supported on a vehicle body by spaced seat slide structures, each of which has its own latch structure, it is difficult to effect simultaneous release of the latch members of both latch structures. Various release arrangements have been provided including adjustable rods or cables, transfer linkages and other similiar structures to attempt such simultaneous release of the latch members.

This invention provides such a release arrangement which is intended primarily for use with the latch structures of this invention but could be used with other latch structures having pivoted latch members which are resiliently biased to latched position. In its preferred embodiment the release arrangement includes a flexible cable having its ends anchored to the latch members of each of the latch structures and extending therebetween with slight slack. A lever is coaxially pivoted with one of the latch members and mounts a pulley or similiar type abutment which is engageable with the cable intermediate the anchored ends thereof. When the lever is rotated, the pulley or abutment thereof engages the cable to shorten the cable between its anchored ends and effect simultaneous release of the latch members of the latch structures. The pulley permits relative rotational movement between the lever and the cable to provide for ease of movement of the latch members to unlatched position.

The primary feature of this invention is that it provides an improved latch structure for seat slide structures which includes a latch member pivoted to the movable one of a pair of track members and having a latch portion extending inwardly through an opening in the base wall of the one track member and terminating in at least one latch tooth which is engageable within openings in the one track member and in the other track member to latch the track members to each other under the bias of a resilient member which is anchored between the latch member and the opening in the one track member. Another feature is that the latch member is located in latched position by engagement against the side edge of the opening in the base wall of the one track member under the bias of the resilient member. A further feature is that the resilient member is a wire spring which extends longitudinally of the latch member and is anchored within the opening of the base wall in the one track member adjacent an end of the latch member. Yet another feature is that a latch structure according to this invention is provided on each of a pair of spaced seat slide structures, with the latch members of such latch structures being interconnected by a cable member which effects simultaneous movement of the latch members to released position when engaged by a pulley or abutment mounted on a lever coaxial with one of the latch members and engageable with the cable intermediate the ends thereof.

These and other features will be readily apparent from the following specification and drawings wherein:

FIG. 1 is a partial broken away side elevational view of a seat slide embodying a latch structure and latch release arrangement according to this invention.

FIG. 2 is a top plan view.

Figure 3:
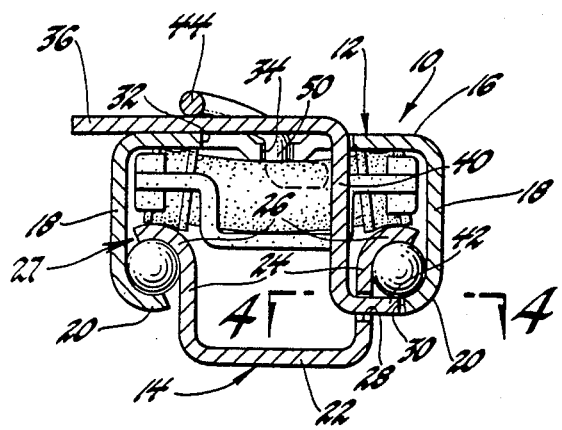
FIG. 3 is an enlarged sectional view taken along line 3—3 of FIG. 2.

Referring now to the drawings, a seat slide 10 includes an upper track member 12 and a lower track member 14. The upper track member 12 includes a base wall 16, a pair of laterally extending side walls 18 and a pair of terminal flanges 20 of arcuate shape, FIG. 3. The lower track member 14 includes a base wall 22, a pair of side walls 24, and arcuate terminal flanges 26. Walls 22 and 24 and flanges 26 are located in opposed spaced relationship to like walls 16 and 18 and flanges 20 of the upper track member 12. The track member 12 is supported on the track member 14 for horizontal adjustment relative thereto by a bearing assembly 27 which may be conventional or of the type shown in copending application, Ser. No. 709,881 Rees filed Mar. 8, 1985 and assigned to the assignee of this invention.

Figure 4:
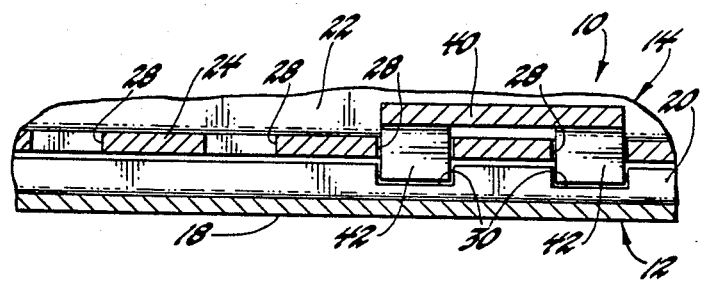
FIG. 4 is a view taken along line 4—4 of FIG. 3.
Figure 6:
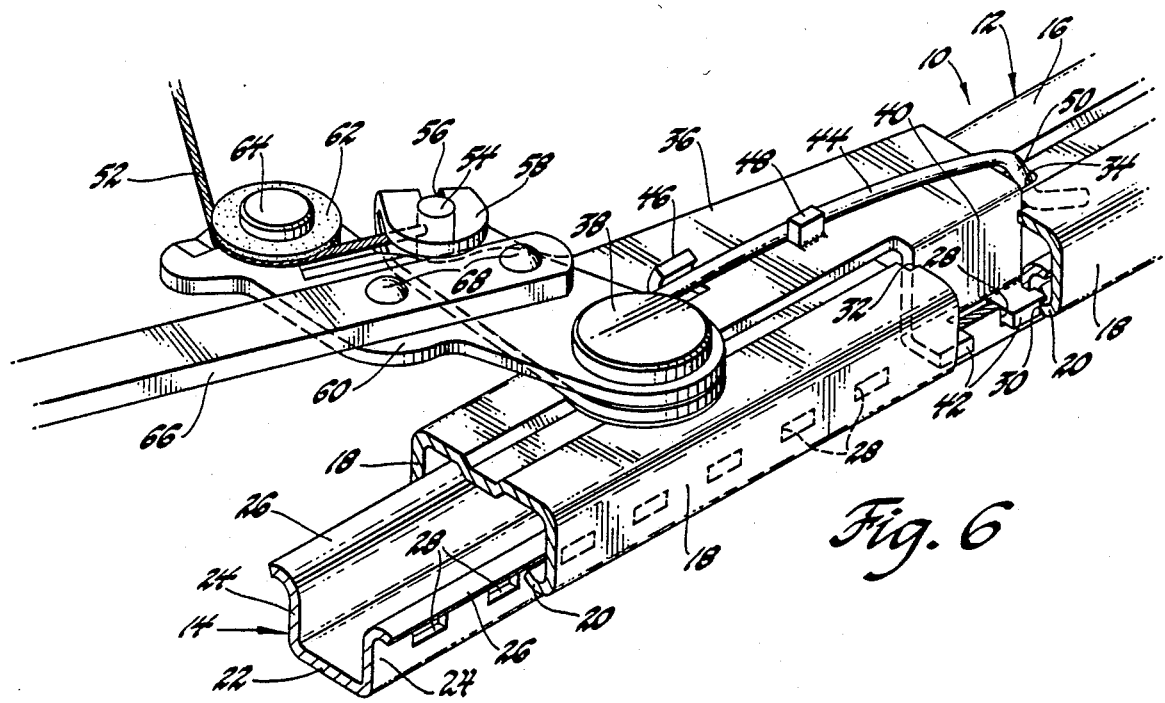
FIG. 6 is a partially broken away perspective view.

One of the side walls 24 of the lower track member 14 is provided with a longitudinal series of openings 28, a successive pair of which are alignable with a pair of openings 30 in the free edge of the one terminal flange 20 of the upper track member 12 which opposes the one side wall 24 of the lower track member, FIGS. 3, 4 and 6.

The base wall 16 of the upper track member 12 is provided with a generally rectangularly shaped opening 32 having an extension 34 from each end edge thereof. A latch member 36 is pivoted at 38 to the base wall 16 and includes a latch portion 40 which extends generally laterally to the latch member and inwardly of the track member 12 through the opening 32. The latching portion 40 terminates in a pair of laterally extending latch teeth 42 which are spaced apart the same distance as the successive pairs of openings 28 and the openings 30. When the latch member 36 is in latched position, the latch teeth 42 extend outwardly through a pair of the openings 28 and into the openings 30, as shown in FIGS. 3, 4, and 6, to latch the track members 12 and 14 to each other against relative horizontal adjustment movement.

A wire spring member 44 is anchored to the latch member 36 by integral lanced bent tabs 46 and 48, the former of which is slightly arcuate. Member 44 has an offset bent end 50 which extends inwardly of the track member 12 through an extension opening 34 so that the spring member is anchored between the latch member and the upper track member. The spring member 44 biases the latch member 36 clockwise as viewed in FIGS. 2 and 6 to latched position wherein the latch portion 40 engages one of the side edges of the opening 32.

Where only one of a pair of seat slide structures is provided with a latch structure, a suitable handle or other operator would be welded or otherwise secured to the latch member 36 so as to move the latch member to released position by rotating it counterclockwise about the pivot 38 against the bias of the spring member 44. This would move the latch teeth 42 out of engagement with the openings 28 and 30 to permit horizontal adjusting movement of the upper track member 12 relative to the lower track member 14.

Where each of a pair of seat slide structures is provided with a latch structure, it is desirable that the latch members of these structures be simultaneously moved to an unlatched or released position to avoid chucking or cocking of the seat during adjusted movement of the upper track members of the slide structures relative to the lower track member. In order to accomplish this simultaneous release of the latch members 36 of both latch structures, a flexible cable 52 has each end thereof provided with a cylindrical abutment 54 which is secured within a slot 56 of a reversely bent integral ear 58 of each of the latch members 36. The cable is slightly slack between its anchored ends.

Figure 5:
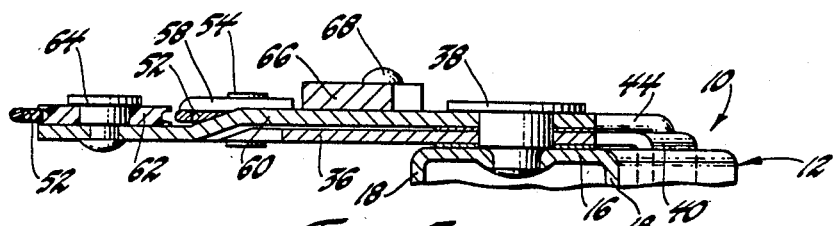
FIG. 5 is an enlarged sectional view taken along line 5—5 of FIG. 2.

A release lever 60 is coaxially pivoted with one of the latch members 36 on a pivot 38. The release lever has a slightly offset end as shown in FIG. 5 which pivotally mounts a pulley 62 at pivot 64. The pulley is grooved and is engageable with the cable 52 intermediate the anchored ends thereof. A manually operative handle 66 is riveted at 68 to the lever 60 to effect counterclockwise rotation thereof. When it is desired to horizontally adjust the seat secured to the spaced track members 12, the handle 66 is operated to rotate the lever 60 slightly counterclockwise to its position shown in dash lines in FIG. 2. As the lever rotates to this position, the pulley 62 pivotally shortens the cable 52 intermediate its anchored ends so that both of the latch members 36 are simultaneously rotated about their respective pivots 38 to released position to free the upper track members 12 for simultaneous horizontal adjustment to a new position.

Thus this invention provides an improved latch structure for a seat slide and an improved release arrangement for latch structures of spaced seat slides mounting a seat on a vehicle.

The embodiments of the invention in which an exclusive property or privilege is claimed are defined as follows:

1. A seat slide comprising, in combination, a pair of generally U-shaped internested track members, each track member including a base wall, side walls extending therefrom and terminal flanges, with the base wall, side walls and terminal flanges of the track members being located in respective opposed spaced relationship to each other, bearing means movably supporting one track member on the other track member for movement relative thereto, the base wall of the one track member including an opening therethrough, one side wall of the other track member including a series of openings therein, one terminal flange of the one track member including at least one opening therein, a latch member pivoted to the outer side of the base wall of the one track member and including a latch portion extending inwardly of the base wall of the one track member through an opening therein and terminating in at least one laterally outwardly extending latch tooth engageable in latched position within at least one of a series of openings in the side wall of the other track member and at least one opening in the terminal flange of the one track member to latch the track members to each other, and a wire spring member having one end portion secured to the latch member and another end portion anchored within the opening in the one track member to resiliently engage the latch portion of the latch member with a complementary shaped side edge portion of the opening in the base wall of the one track member and maintain the latch tooth in latched position and means for rotating the latch member about the pivot thereof to move the latch tooth out of the openings in the terminal flange of the one track member and side wall of the other track member to permit movement of the one track member relative to the other track member.

2. The combination comprising, a pair of spaced seat slides, each slide including a pair of track members, bearing means movably supporting one track member of each seat slide on the other track member of such seat slide for movement relative thereto, a latch member pivoted to the one track member of each seat slide and including a latch portion engageable in latched position with openings in the one and the other track members to latch the track members of each seat slide to each other, resilient means biasing each latch member to latched position, a cable member interconnecting the latch members, and a release lever coaxially pivoted with one latch member and including a pulley engageable with the cable intermediate its connections to the latch members to effect simultaneous rotation of the latch members to released position against the bias of the resilient means.

* * * * *